United States Patent
Simon

(10) Patent No.: US 9,616,892 B2
(45) Date of Patent: Apr. 11, 2017

(54) AUTOMATIC SHIFTING SYSTEM FOR A VEHICLE

(71) Applicant: AMERICAN-IOWA MANUFACTURING INC., Cascade, IA (US)

(72) Inventor: Shane D. Simon, Cascade, IA (US)

(73) Assignee: American-Iowa Manufacturing Inc., Cascade, IA (US)

( * ) Notice: Subject to any disclaimer, the term of this patent is extended or adjusted under 35 U.S.C. 154(b) by 0 days.

(21) Appl. No.: 14/828,044

(22) Filed: Aug. 17, 2015

(65) Prior Publication Data

US 2017/0050639 A1    Feb. 23, 2017

(51) Int. Cl.
| | | |
|---|---|---|
| *B60W 30/18* | (2012.01) | |
| *B60W 10/11* | (2012.01) | |
| *B60W 10/06* | (2006.01) | |
| *F16H 59/10* | (2006.01) | |
| *F16H 59/02* | (2006.01) | |

(52) U.S. Cl.
CPC ............ *B60W 30/18* (2013.01); *B60W 10/06* (2013.01); *B60W 10/11* (2013.01); *B60W 2540/16* (2013.01); *B60W 2710/0605* (2013.01); *B60W 2710/1005* (2013.01); *F16H 59/105* (2013.01); *F16H 2059/0256* (2013.01)

(58) Field of Classification Search
None
See application file for complete search history.

(56) References Cited

U.S. PATENT DOCUMENTS

| | | | | |
|---|---|---|---|---|
| 4,416,230 A | * | 11/1983 | Katayose | ............. B60W 30/18 |
| | | | | 123/179.16 |
| 5,048,638 A | | 9/1991 | Duncan et al. | |
| 5,921,884 A | * | 7/1999 | Nishiwaki | ............. F16H 61/20 |
| | | | | 475/63 |
| 6,076,414 A | * | 6/2000 | Tabata | ................... F16H 59/10 |
| | | | | 74/335 |
| 6,098,003 A | * | 8/2000 | Kozaki | ................ F16H 61/061 |
| | | | | 701/51 |
| 2003/0075378 A1 | | 4/2003 | Sprinkle et al. | |
| 2004/0180753 A1 | | 9/2004 | Takamura et al. | |
| 2005/0103555 A1 | | 5/2005 | Cannon et al. | |
| 2009/0029826 A1 | * | 1/2009 | Eguchi | ..................... B60T 7/02 |
| | | | | 477/39 |
| 2009/0143948 A1 | | 6/2009 | Dahl et al. | |
| 2013/0282214 A1 | * | 10/2013 | Goebel | ................. B62D 6/001 |
| | | | | 701/22 |

OTHER PUBLICATIONS

International Searching Authority, "Notification of Transmittal of the International Search Report and the Mitten Opinion of the International Searching Authority", for PCT/US2016/047345, mailed Nov. 3, 2016, 9 pages.

* cited by examiner

*Primary Examiner* — Justin Holmes
(74) *Attorney, Agent, or Firm* — Zarley Law Firm, P.L.C.

(57) ABSTRACT

A shifting system for a vehicle includes an engine with a throttle connected to a transmission. An activating assembly is connected to the transmission, the throttle and a brake. The activating assembly is capable of activating the transmission to change direction.

10 Claims, 2 Drawing Sheets

AUTOMATIC SHIFTING SYSTEM FOR A VEHICLE

BACKGROUND OF THE INVENTION

This invention is directed to a shifting system for a vehicle and more particularly a shifting system capable of changing direction without the need for a separate shift pedal.

Shifting systems are well known in the art. For vehicles used for golf course and baseball field maintenance, as well as golf carts, a mechanical transmission is typically used where to change directions a shift pedal is actuated and then a separate pedal is used to accelerate. In applications such as bunker raking, where direction changes are frequent, the use of separate shift and acceleration pedals to change direction is time consuming and inconvenient.

Hydraulic systems permit the change of direction, but hydraulic systems are expensive, complex, and present a risk of leaking fluids into a golf course causing damage. Also, most systems require either mechanical or hydraulic activation of a brake to stop the vehicle and prevent the vehicle from coasting. As a result, a need exists in the art for a system that addresses these deficiencies.

Therefore, an objective of this invention is to provide a shifting system that provides a simple way of changing directions.

Another objective of the present invention is to provide a solenoid actuator with a transmission to change direction.

A still further objective of the present invention is to provide a system having an activating assembly that releases a brake that is normally activated.

These and other objectives will be apparent to one of ordinary skill in the art based upon the following written description, drawings, and claims.

SUMMARY OF THE INVENTION

A shifting system for a vehicle has an engine with a throttle connected to a transmission. An activating assembly is connected to the transmission, the throttle, and a brake. The activating assembly is capable of activating a cylinder associated with the transmission to change the direction the vehicle will travel. The activating assembly is also capable of activating a cylinder associated with the throttle to change the speed at which the vehicle travels. Finally, the activating assembly is capable of activating a cylinder associated with the brake to release the brake which in normally on.

DETAILED DESCRIPTION OF THE PREFERRED EMBODIMENT

Figure 1:
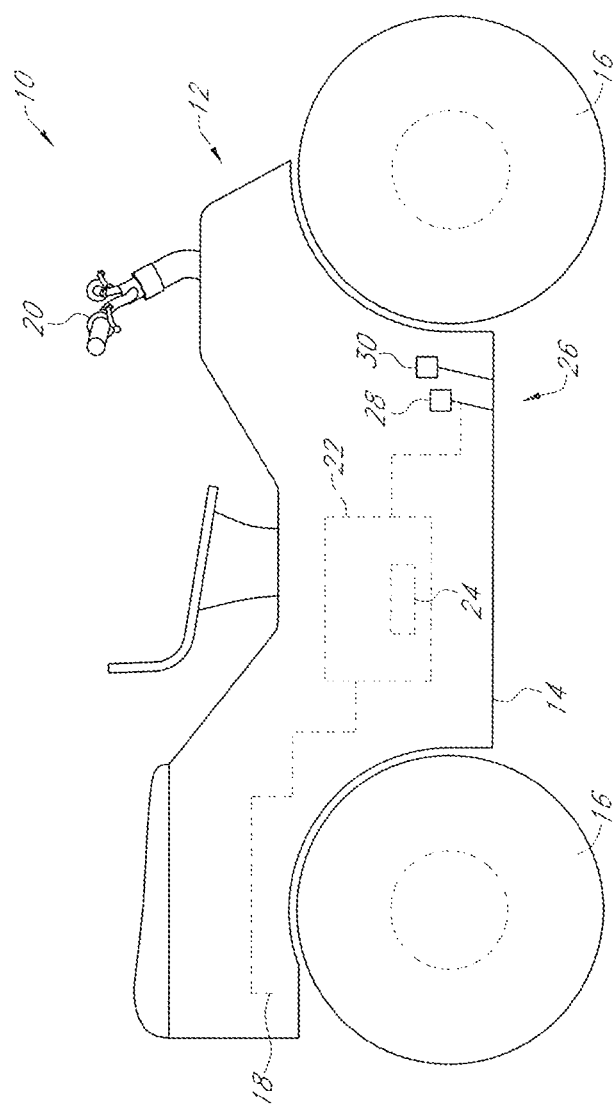
FIG. 1 is a side view of a vehicle having a shifting system.
Figure 2:
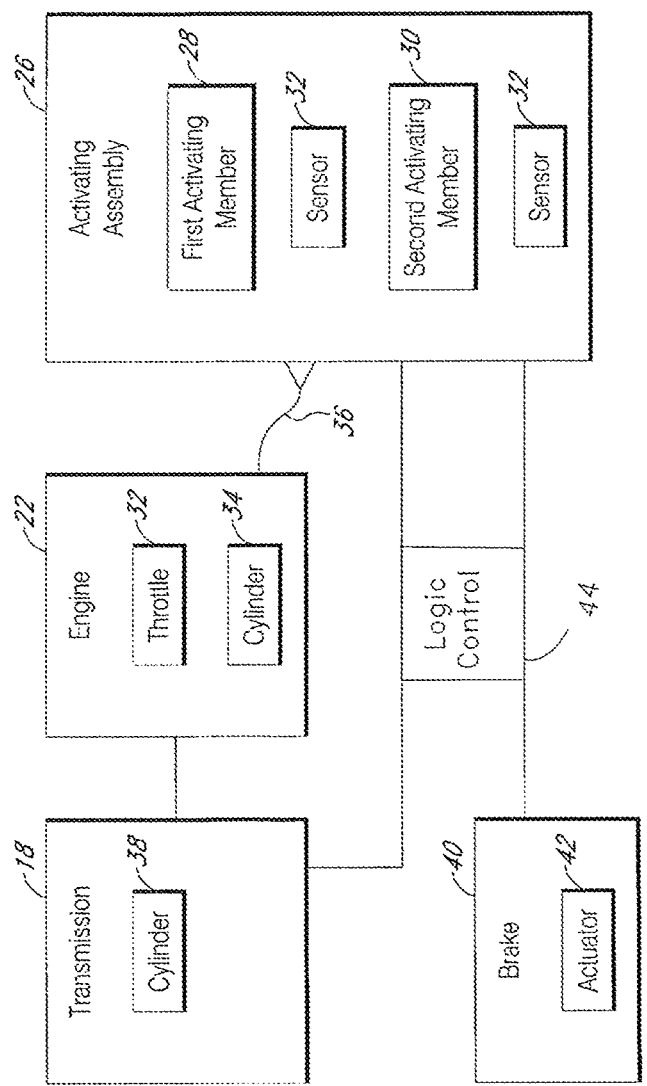
FIG. 2 is a schematic view of a shifting system for a vehicle.

Referring to the figures, a shifting system 10 is shown as used with a vehicle 12 having a frame 14 supported by a plurality of wheels 16. The wheels 16 are operatively connected to a transmission 18, that preferably is mechanical, and to a steering system 20. An engine 22, having a throttle 24 is operatively connected to the transmission 18, and to an activator assembly 26.

As an example only, the activator assembly 26 has a first activating member 28 and a second activating member 30. The activating members 28 and 30 preferably are pedals for operation with a foot and alternatively are buttons, levers, stick shifts or the like. The members 28 and 30 are moveably mounted to the frame 14 such that in a first inoperative position the members 28 and 30 engage or are detected by a sensor 32 such as a proximity switch or the like. The members 28 and 30 are connected to a cylinder 34 that activates the throttle 24 such as a two-in-one cable 36. Alternatively, as an example only, members 28 and 30 are electrically wirelessly, mechanically pneumatically, or hydraulically connected to the cylinder 34.

The sensors 32 are connected to a cylinder 38 that actuates the transmission electrically, wirelessly, pneumatically, mechanically, or hydraulically. Also, the members 28 and 30 are connected to an actuator 40 associated with the brake 42 and a logic control 44 is associated with the members 28 and 30 and/or the sensors 32.

In operation, one of the members 28 or 30 are manually activated. When the first member 28 is activated, the sensor 32 sends a signal to cylinder 38 which actuates the transmission 18 for forward movement. As the first actuator is moved away from the sensor 32, the member 28 actuates cylinder 34 to release throttle 24. The further member 28 is moved from sensor 32 the greater the throttle 18 is released increasing the speed of the vehicle 12. A transaxle, (not shown) may be used for multiple speeds. As member 28 is moved away from sensor 32, the member 28 and or sensor 32 send a signal to actuator 40 releasing the brake which is always on in a non-operative state of the vehicle. When the first member 28 is released, the brake 42 reengages to bring the vehicle 12 to a stop.

To change directions, the second member 30 is moved away from the sensor 32. As the second member 30 is moved away sensor 32 sends a signal to cylinder 38 which actuates transmission 18 to move in a rearward direction. Member 30 also sends a signal to cylinder 34 releasing the throttle 24. The sensor 32 and/or member 30 send a signal to actuator 40 releasing the brake. When neither member 28 or 30 are activated the vehicle 12 idles with the brake 42 on. Accordingly, a shifting system has been disclosed that at the very least meets all the stated objectives.

What is claimed is:
1. A shifting system for a vehicle, comprising:
an engine having a throttle mounted to a frame;
a transmission mounted to the frame and connected to the engine; and
an activating assembly having a first actuating member and a second actuating member moveably mounted to the frame and both the first and second actuating members directly connected to the throttle and directly connected to the transmission activating the transmission to change directions and activating the throttle to change a speed of the vehicle.
2. The system of claim 1 wherein the activating assembly has a first activating member and second activating member.
3. The system of claim 2 wherein when the first activating member is activated the transmission is actuated and as the first member is activated the throttle is released.
4. The system of claim 1 wherein the activating assembly has at least one sensor capable of detecting a first and a second activating member.
5. The system of claim 4 wherein the at least one sensor is a proximity switch.
6. The system of claim 1 wherein the activating assembly activates a solenoid cylinder associated with the throttle.

7. The system of claim 1 wherein the activating assembly activates a solenoid cylinder associated with the transmission.

8. The system of claim 1 wherein the activating assembly activates an actuator associated with a brake.

9. The system of claim 1 wherein the actuating assembly is connected to a cylinder with a two-in-one cable.

10. A shifting assembly for a vehicle, comprising:
   an engine having a throttle mounted to a frame;
   a transmission mounted to the frame and connected to the engine;
   an activating assembly having a first actuating member and a second actuating member connected to the throttle and the transmission; and
   a sensor positioned to detect movement of the first and the second actuating members wherein when the first actuating member is activated the transmission is actuated for forward movement as the throttle is released.

* * * * *